June 20, 1939.  E. L. BRINKER ET AL  2,162,909
APPARATUS FOR RECOVERING METALS AND OTHER SUBSTANCES FROM AQUEOUS LIQUIDS
Filed Sept. 17, 1935 2 Sheets-Sheet 1
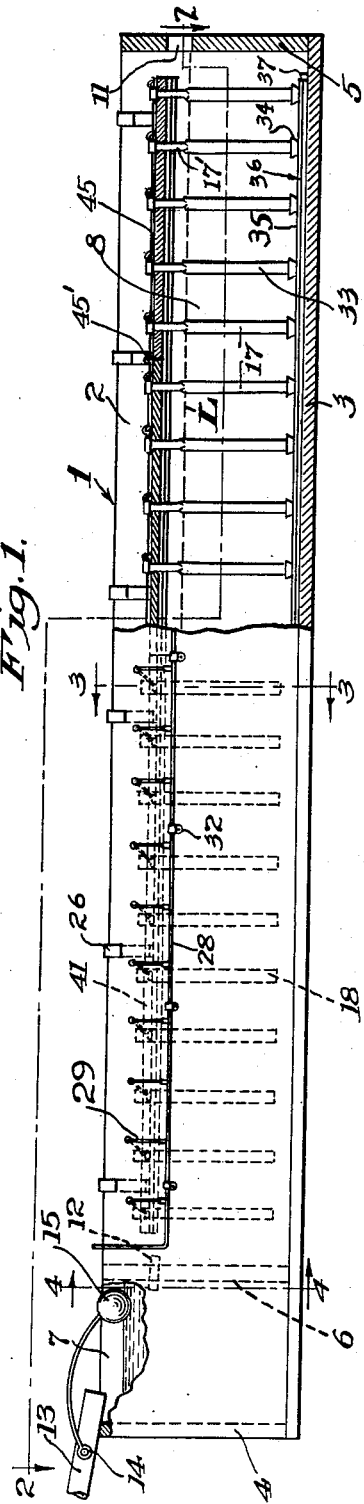
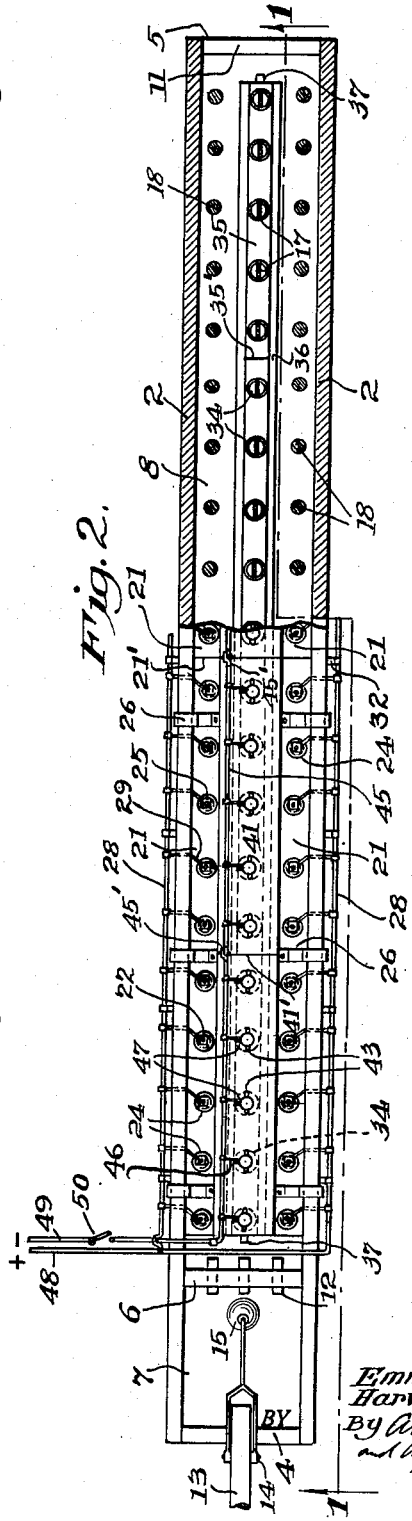
INVENTORS:
Emmett L. Brinker
Harvey J. Gray,
BY
ATTORNEYS.

June 20, 1939.  E. L. BRINKER ET AL  2,162,909

APPARATUS FOR RECOVERING METALS AND OTHER SUBSTANCES FROM AQUEOUS LIQUIDS

Filed Sept. 17, 1935  2 Sheets-Sheet 2

INVENTORS:
Emmett L. Brinker
Harvey J. Gray
BY
ATTORNEYS.

Patented June 20, 1939

2,162,909

UNITED STATES PATENT OFFICE 2,162,909

APPARATUS FOR RECOVERING METALS AND OTHER SUBSTANCES FROM AQUEOUS LIQUIDS

Emmett L. Brinker and Harvey J. Gray, Los Angeles, Calif., assignors, by direct and mesne assignments, of thirty per cent to A. W. Knight, South Pasadena, Calif.

Application September 17, 1935, Serial No. 40,904

5 Claims. (Cl. 204—5)

This invention relates to the extraction or recovery of finely dispersed substances from aqueous liquids, and particularly to an apparatus which may be employed to provide an efficient and economic recovery of metals or other substances which are present in a finely dispersed state in an aqueous liquid.

The invention may be applied to the recovery of metals or other substances which are present in an aqueous liquid, either in solution or in colloidal suspension, or other finely dispersed state, and the expression "finely dispersed" will be understood to include any of these types of dispersion.

The invention is intended particularly for the recovery of gold or other metal or metals from sea water, brine, or other aqueous liquids containing the same in solution or other finely dispersed state, but may also be used for the recovery of substances other than metals.

The principal object of the invention is to provide an advantageous apparatus for the recovery of gold or other metals, or other substances present in finely dispersed state in an aqueous liquid.

A further object of the invention is to provide an apparatus for the above purposes, in which a large quantity of liquid may be treated in an apparatus of relatively small size, and at a relatively low cost.

A further object of the invention is to provide for continuous separation and collection of the extracted substance or substances, and to provide for the convenient removal of the material thus collected.

A further object of the invention is to provide an apparatus for the above purposes, in which the active portions or elements of the apparatus are readily accessible and may be easily removed from the apparatus for cleaning, repair, adjustment, or replacement.

Further objects of the invention will be either pointed out hereinafter or will be apparent from tht following description.

According to the present invention, the aqueous liquid to be treated is caused to flow in a stream between oppositely charged electrode means, and a suitable electrical potential is applied to said electrodes in order to cause movement or migration of the desired metal or metals or other substance or substances toward one or both of said electrode means, and a thin coating or film of mercury is formed and maintained upon the surface of the negative electrode means for facilitating the deposition and collection of the desired substance or substances such as gold or other metal or metals which are separated at said negative electrode means. According to a preferred embodiment of the invention, the opposing electrode means are disposed in substantially vertical position, spaced from one another in a direction transverse to the direction of flow of the liquid stream, and the lower portion of the negative electrode or cathode means is immersed in or maintained in contact with a body of mercury, in such manner as to establish and maintain the above-mentioned film or coating of mercury on the surface of said electrode means during operation.

The cathode means is preferably made of an electrically conductive material which is substantially resistant to corrosive action of the liquid to be treated and which is readily coated or amalgamated by mercury. A metal having the above properties, such as copper or silver, is advantageously adapted for this purpose. The positive electrode or anode means is preferably made of carbon, such as the so-called "electrode carbon", or other carbonaceous material, or, in general, an electrically conductive material which will not go into solution in the aqueous liquid to be treated upon passage of an electric current from said material through said liquid. It will be understood, however, that composite electrode members may be employed, comprising cores or other body portions formed of any suitable material, with surface coatings or envelopes of electrode materials of the types above described, it being immaterial whether or not the entire electrode members are made of such materials.

We prefer to provide a plurality of sets of opposing electrodes arranged for successive flow of liquid therebetween. As illustrated by the specific embodiment of the invention hereinafter described, each set of electrodes preferably comprises two anodes disposed adjacent the opposite sides of the liquid stream and a single cathode positioned substantially midway between the two anodes. It will be understood, however, that the invention is not restricted to this particular arrangement of electrodes. Means are provided for connecting the several cathodes to the negative terminal, and the several anodes to the positive terminal, of a source of electric current of relatively low voltage. The electrodes are preferably so mounted that they may be easily removed from the apparatus, either separately or in groups, and may be readily connected to and disconnected from the source of electric current.

The apparatus preferably further comprises a suitable trough-like receptacle in which one or more sets of electrodes are mounted in opposing relation at intervals along the length thereof, and means for introducing the aqueous liquid to be treated into said receptacle, preferably at one end thereof, and discharging the spent liquid from said receptacle, preferably at the other end thereof, while maintaining a stream or body of such aqueous liquid of suitable depth in said receptacle, between said electrodes.

The accompanying drawings illustrate a preferred form of apparatus according to this invention, and referring thereto:

Fig. 1 is a partly sectional side elevation of the apparatus, on line 1—1 in Fig. 2;

Fig. 2 is a partly sectional plan view thereof on line 2—2 in Fig. 1;

Figure 3:
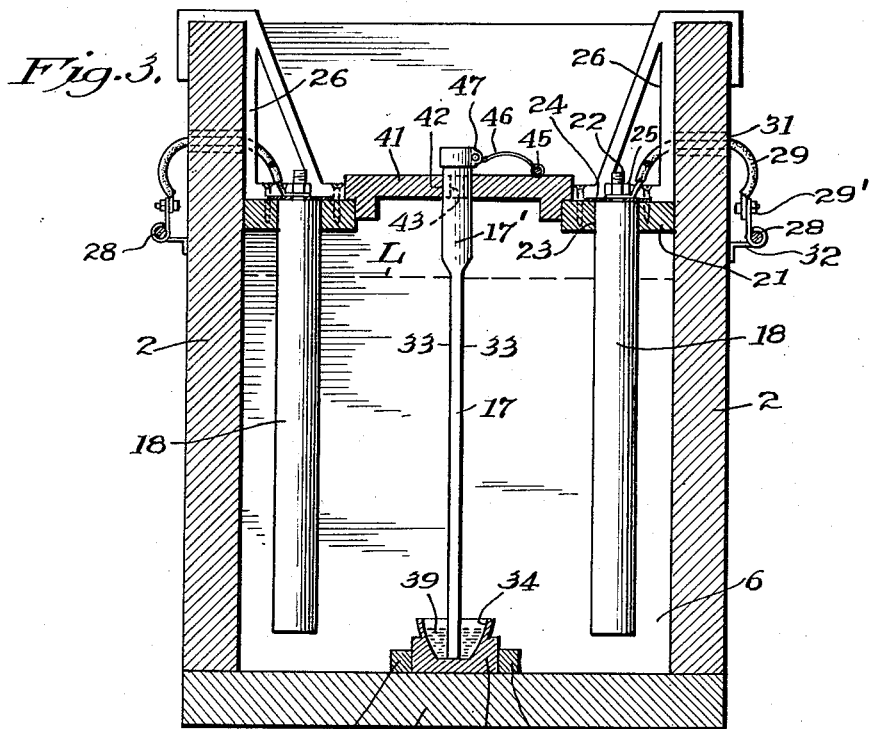
Fig. 3 is a transverse section of the apparatus adjacent one of the sets of opposing electrodes, on line 3—3 in Fig. 1.
Figure 4:
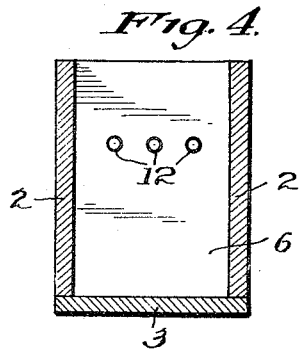
Fig. 4 is a transverse section on line 4—4 in Fig. 1.
Figure 5:
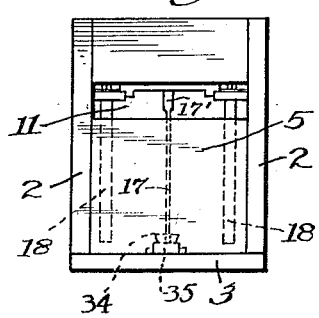
Fig. 5 is an end view of the apparatus, from the discharge end.

The apparatus is shown as comprising an elongated receptacle or trough 1 comprising side walls 2 and bottom wall 3 and also provided with end walls 4 and 5 at the inlet and outlet ends respectively.

Spaced somewhat from end wall 4 is a transverse vertical partition 6 extending across the width of the receptacle and from the bottom thereof to a height somewhat above the desired liquid level in the receptacle. Said partition serves to provide an inlet compartment 7 between said partition and the end wall 4, and a horizontally elongated extraction chamber 8 between said partition and the other end wall 5. In order to maintain the desired liquid level in the extraction chamber 8, as indicated for example by the dotted line L, an overflow opening 11 is preferably provided at a suitable level in the end wall 5 at the discharge end of the apparatus, and means are also preferably provided for maintaining a substantially constant rate of introduction of aqueous liquid from inlet compartment 7 into the extraction chamber. While various means may be provided for this purpose, we have shown the partition 6 as provided with a plurality of short feed pipes or tubes 12 extending therethrough at a level adjacent or somewhat above the desired liquid level in the extraction chamber, and have provided means for maintaining a substantially constant height of liquid in the inlet compartment, extending somewhat above the level of the pipes 12. For this purpose the aqueous liquid to be treated may be supplied to said inlet compartment through the pipe or conduit 13 provided with valve 14 controlled by a float device 15, supported by the liquid in said compartment, said float device operating in well-known manner to regulate the opening of valve 14 so as to maintain the liquid level in said compartment substantially constant, and at a level between the top of the receptacle and the pipes 12.

Disposed at intervals along the length of the extraction chamber 8 are a series of sets of opposing electrodes. In general, each set includes at least one negative electrode or cathode and at least one positive electrode or anode, the electrodes of each set being spaced from one another in a direction transverse to the direction of liquid flow, and preferably substantially opposite one another. In the drawings, we have shown a preferred arrangement, in which each set of electrodes comprises a vertically extending cathode 17 disposed substantially centrally of the extraction chamber, and two anodes 18 disposed at opposite sides thereof and adjacent the respective side walls 2.

Each of the anodes 18 is shown as comprising a vertically disposed cylindrical member, formed of carbon or other solid carbonaceous material. Said anodes are supported and positioned at their upper ends by anode supports extending longitudinally of the extraction chamber and preferably above the liquid level therein. Said anode supports are preferably made in sections of convenient length, as shown at 21 in Fig. 2, with a plurality of anodes associated with and supported by each section. In the apparatus shown, there are two such sections 21 at each side of the apparatus, said sections being disposed end to end at 21' and each serving to support and position ten adjacent anodes at that side of the extraction chamber. These anode supports may be made of wood or other suitable material of relatively low electrical conductivity. The anodes may be mounted on the supports 21 in any suitable manner, but we have shown each anode as provided at its upper end with a threaded lug 22. The upper end of the anode extends through an opening 23 in the support 21, and a centrally apertured disc or the like 24 is placed over the lug 22 and held in position thereon by a nut 25. The disc 24 is of somewhat larger diameter than the opening 23, so as to rest upon the support 21 around said opening, to support the anode. The anode supports 21 are shown as held in position by brackets 26 secured thereto at suitable intervals, said brackets removably engaging and resting upon the upper edge portion of the adjacent side wall 2.

An electrical conductor 28 extends along each side of the apparatus and is connected to the respective anodes by branch conductors 29 detachably connected thereto as at 29' and extending through openings 31 in side wall 2 and secured to the anodes in any suitable manner, as by the nuts 25. The conductors 28 may be supported from the side wall at intervals, as shown at 32.

In practice, we have found that advantageous results are obtained by the use of cathodes provided with two substantially flat or plane surfaces disposed outwardly toward the opposing anodes. Each cathode 17, therefore, may advantageously be formed from a suitable length of round tubing of copper, silver, or other corrosion-resistant metal which is easily coated or amalgamated by mercury, flattened laterally to a height adjacent or somewhat above the desired liquid level, so as to provide two flat faces 33 disposed toward and opposite the corresponding anodes 18 as shown in Figs. 2 and 3.

Suitable means are provided for maintaining a body of liquid mercury in contact with the lower portion of each cathode. For this purpose we prefer to provide a cup-shaped receptacle 34 disposed immediately below each cathode, and said receptacles may conveniently be formed in flat strips 35 extending longitudinally and centrally of the reaction chamber, resting upon the bottom wall 3 thereof. Said strips 35 may be of any suitable length, and may each be provided with any desired number of receptacles 34 formed therein. In the particular apparatus shown, four such strips are disposed end to end as at 35', with five mercury receptacles 34 in each strip. Said strips may be held in central position by longitudinal guide strips 36 secured to the bottom wall 3 and may be properly positioned longitudinally by guide blocks 37 also secured to the bottom wall 3.

The lower end of each cathode is shown as resting on the bottom of the corresponding receptacle 34, although it will be understood that the cathodes may, if desired, be supported independently, with the lower portions thereof extending within the receptacles 34. A body of mercury, indicated at 39, is provided in each receptacle 34, the lower portion of the corresponding cathode extending into and in contact with said body of mercury.

The inner side walls of each of the mercury receptacles are preferably inclined outwardly in an upward direction, and of somewhat concave curvature in vertical cross-section, as shown in Fig. 3.

Means are provided for holding the cathodes in substantially vertical position, and such means may advantageously comprise cover sections 41 extending longitudinally of the apparatus and supported at their lateral edges on the anode supports 21, and provided with openings 42 fitting fairly closely around the upper end portions 17' of the cathodes 17. Each of said openings may be provided with two diametrically opposed notches 43, forming a horizontally elongated opening sufficient to permit passage of the flattened lower portion of the cathode therethrough. The apparatus shown is provided with four such cover sections 41 disposed end to end as at 41', each serving to position five adjacent cathodes.

An electrical conductor 45 extends longitudinally of the apparatus, above the cover sections 41 and adjacent the upper ends of the cathodes, and each cathode is connected to said conductor by a branch conductor 46 and a detachable clip 47.

The conductor 45 is shown as comprising four sections, corresponding to the four cover sections 41, and connected end to end by suitable detachable connecting means, as at 45', so that each cover section, with the cathodes supported thereon and their branch conductors 46 and conductor section 45, may be disconnected from the line and independently removed as a unit. By loosening the connecting clips 47, the cathodes may then be removed from the cover sections by lowering the upper end portions thereof through the openings 42. If desired, however, the cathodes may be separately disconnected by loosening the connecting clips 47, and may be individually removed through the openings 42 in the cover sections, the flattened portions of the cathodes passing through the notches 43.

As shown diagrammatically in Fig. 2, the anode conductors 28 and cathode conductor 45 are connected by wires 48 and 49 respectively, to the positive and negative terminals of a suitable low voltage source of direct electric current, such as a generator or a storage battery. A switch 50 is preferably provided in the circuit.

In the operation of the above described apparatus, each mercury receptacle 34 is filled with mercury to a sufficient depth to obtain good contact with the lower portion of the corresponding cathode 17, the surface of the mercury being preferably somewhat below the top of said receptacle. The aqueous liquid to be treated is then passed through the apparatus, preferably in a continuous stream, while electric current is supplied to the electrodes to maintain a relatively low voltage, such as from 1 volt or less to 12 volts or more, between said electrodes. The voltage to be employed in any particular case will depend upon the conductivity of the aqueous liquid, the nature of the material to be recovered therefrom, the electrode spacing, and other factors. The rate of liquid flow may be controlled by the size of the feed pipes 12 and the height of liquid maintained in the inlet compartment 7, depending upon the nature and amount of material which is to be extracted and upon other operating conditions. The electric current passes through the aqueous liquid between each cathode and the opposing anodes, and causes certain finely dispersed materials to be carried toward one or the other of said electrodes and to be released, deposited or separated from the liquid at or adjacent the electrode surface.

We have used the invention with very good results, for the extraction of gold and other substances from sea water and other aqueous liquids. It has long been known that sea water and certain other aqueous liquids contain appreciable, although extremely minute, proportions of gold and other metals in finely dispersed condition, either in colloidal solution or in solution as a salt or salts of the metal or metals. Numerous attempts have been made to evolve a satisfactory method and apparatus for the recovery of gold or other metals from such aqueous liquids, but, so far as we are aware, no method has hitherto been devised which will provide a satisfactory extraction thereof at a cost commensurate with the amount of material recovered, it being appreciated that an extremely large volume of sea water must be treated in order to recover a sufficient amount of gold or other metal to render the process commercially successful.

According to our invention, sea water is passed through the apparatus as above described, and gold contained therein is carried by the electric current toward the cathodes 17, and is separated from the liquid at or adjacent the surfaces of said cathodes and the mercury in contact therewith. We have found that, under the conditions of operation above described, the tendency of the mercury to coat or amalgamate the surface of the metallic cathodes causes the mercury to rise upwardly along the surfaces thereof during the passage of electric current, so as to provide a thin film or coating of mercury upon such surfaces. The separated gold enters this mercury film or coating, and also appears to enter the mercury within the receptacles 34, the surfaces of the bodies of mercury within these receptacles being also negatively charged at substantially the same potential as the surfaces of the cathodes, since said bodies of mercury are in direct electrical contact with said cathodes. The separated gold therefore amalgamates with the mercury and accumulates within the receptacles 34, principally in the form of a sludge or amalgam at the surface of the mercury therein, and also accumulates upon the mercury-coated surfaces of the cathodes. This process can be continued until a suitable amount of gold-bearing sludge or amalgam is obtained in the receptacles 34 and upon the surfaces of the cathodes 17, or until the extraction efficiency of the apparatus has decreased to the point where further continued operation is not economical. The operation may then be suspended, and the cover sections 41, together with the cathodes 17 associated therewith, may be removed, after which the several strips 35 carrying the mercury receptacles 34 may also be removed. The gold amalgam is then collected, including not only the amalgam within the mercury receptacles 34, but also, if desired, any amalgam adhering to the surface of the cathodes, and the amalgam thus collected can be treated in any well known manner to recover gold therefrom.

A fresh supply of mercury is then placed within the receptacles 34, and the apparatus re-assembled, for further operation.

It is not generally necessary to remove all the mercury from the receptacles 34 after each run, and we ordinarily remove only the gold-bearing sludge or amalgam accumulated at the surface thereof, and add sufficient fresh mercury to fill the receptacles to the desired level. The cathodes 17 may be cleaned after each run, but in order to save time we prefer to substitute another set of clean cathodes therefor, and to clean the removed cathodes at some other time. In any event, we prefer, in general, to start each run with clean-surfaced cathodes throughout the length of the apparatus, and with clean mercury in all the receptacles 34, although it will be understood that, if desired, the cathodes and the mercury receptacles may be removed and replaced individually or in successive groups.

The anodes 18 may also be removed and cleaned in case any materials deposit or accumulate thereon to an undesirable extent. The anodes may be separately disconnected from the branch conductors 29, by loosening nuts 25, and individually removed from the supporting sections 21. However, the operation may be simplified by disconnecting the branch conductors 29 from the conductor 28, as at 29', and removing each supporting section 21 with its associated anodes, as a unit.

The following data were obtained in an actual operation in which sea water was passed through an apparatus of the type above described, having five sets of electrodes in series. Each set of electrodes comprised a central cathode and two anodes, as shown above. Fifty gallons of sea water were passed through the apparatus and re-circulated twenty times, which may be regarded as roughly comparable to a single passage between 100 sets of electrodes in series.

| | |
|---|---|
| Distance from each cathode to each opposing anode inches | 3½ |
| Spacing between sets of electrodes do | 4 |
| Active height of each cathode do | 5½ |
| Active height of each anode do | 3¾ |
| Average line potential volts | 3 |
| Average total current amperes | 4.5 |
| Average rate of flow gal/min | 3.77 |
| Amount of gold recovered mg | 1.87 |

Other metals contained in a finely dispersed state in sea water or other aqueous liquid may also be separated and recovered in substantially the same manner as described above. Among other metals which may be recovered are silver and copper, and it will be understood that the invention may be employed for the recovery of one metal, such as gold, silver or copper, or for the simultaneous recovery of two or more metals, from aqueous liquids containing the same.

Some gas is also ordinarily separated from the aqueous liquid and evolved at or adjacent the surfaces of one or both of the oppositely charged electrodes. For example, in the treatment of sea water, hydrogen may be liberated adjacent the cathode means, and chlorine or oxygen may be liberated adjacent the anode means. If desired, the apparatus may be provided with a tight fitting cover to form a gas collecting compartment above the surface of the liquid, and said compartment may, if desired, be partitioned so as to provide separate compartments for collection of gases evolved adjacent the cathode means and the anode means, and suitable means may be provided for withdrawing and recovering the gas or gases collected in said compartment or compartments.

In case the aqueous liquid being treated contains dissolved salts, such as bromides, phosphates or borates of sodium, calcium or other metals, such salts may also separate and collect at or adjacent the surfaces of the electrodes, usually at the cathode means and the mercury in contact therewith, and any salts thus collected may also be removed and recovered.

It will be understood that any desired number of sets of electrodes may be provided in a single extraction chamber, arranged for passage of liquid therebetween in series or parallel flow, and that any desired number of such extraction chambers may be arranged for series or parallel flow of liquid therethrough, in order to provide for the desired completeness of extraction of gold or other substance and to also provide the relatively large capacity which would be required to handle volumes of sea water or other aqueous liquid, in large-scale commercial operation.

It will also be understood numerous modifications may be made in the construction and operation of the apparatus without departing from the spirit of our invention, the scope of which invention is defined in the appended claims.

We claim:

1. An apparatus for recovering finely dispersed substances from aqueous liquids comprising: a horizontally elongated extraction chamber provided with two spaced side walls, a bottom wall, liquid inlet means at one end and liquid outlet means at the other end; two anode supports disposed within said chamber adjacent the respective side walls and having their inner edges spaced from one another; a plurality of vertically extending anodes removably supported on each of said anode supports and extending beneath said supports, the anodes corresponding to each support being spaced from one another horizontally in a row, and being each disposed transversely opposite and spaced from an anode in the other row; cover means removably supported on said anode supports and substantially covering the space therebetween; a plurality of vertically extending cathodes removably supported on said cover means and extending therebeneath substantially midway between and transversely alined with and spaced from the respective oppositely disposed anodes; a plurality of cup-shaped mercury receptacles disposed within said chamber adjacent the bottom wall, surrounding the lower ends of the respective cathodes; and a body of liquid mercury in each of said receptacles in contact with the lower end portion of a corresponding cathode.

2. An apparatus as set forth in claim 1, said cover means comprising a plurality of sections disposed end to end, each of said sections supporting a plurality of cathodes and being mounted on said anode support for removal independently of each other section.

3. An apparatus as set forth in claim 1, said cover means comprising a plurality of sections disposed end to end, each of said sections supporting a plurality of cathodes and being mounted on said anode support for removal independently of each other section, and said apparatus further comprising a plurality of conductor sections corresponding to and extending over the respective cover sections, each of said conductor sections being connected to the several cathodes supported by the corresponding cover section, and said conductor sections being detachably connected together end to end.

4. An apparatus as set forth in claim 1, said anode supports being removably mounted on the respective side walls of said chamber.

5. An apparatus as set forth in claim 1, and also comprising removable means for supporting said mercury receptacles on the bottom wall of said chamber and comprising a plurality of strips disposed end to end in position on said bottom wall, each of said strips supporting a plurality of said mercury receptacles, and said apparatus further comprising guide means secured to said wall and engaging said strips to position the mercury receptacles transversely and longitudinally with respect to the corresponding cathodes, each of said strips being removable from engagement with said guide means independently of the other strips.

EMMETT L. BRINKER.
HARVEY J. GRAY.